UNITED STATES PATENT OFFICE.

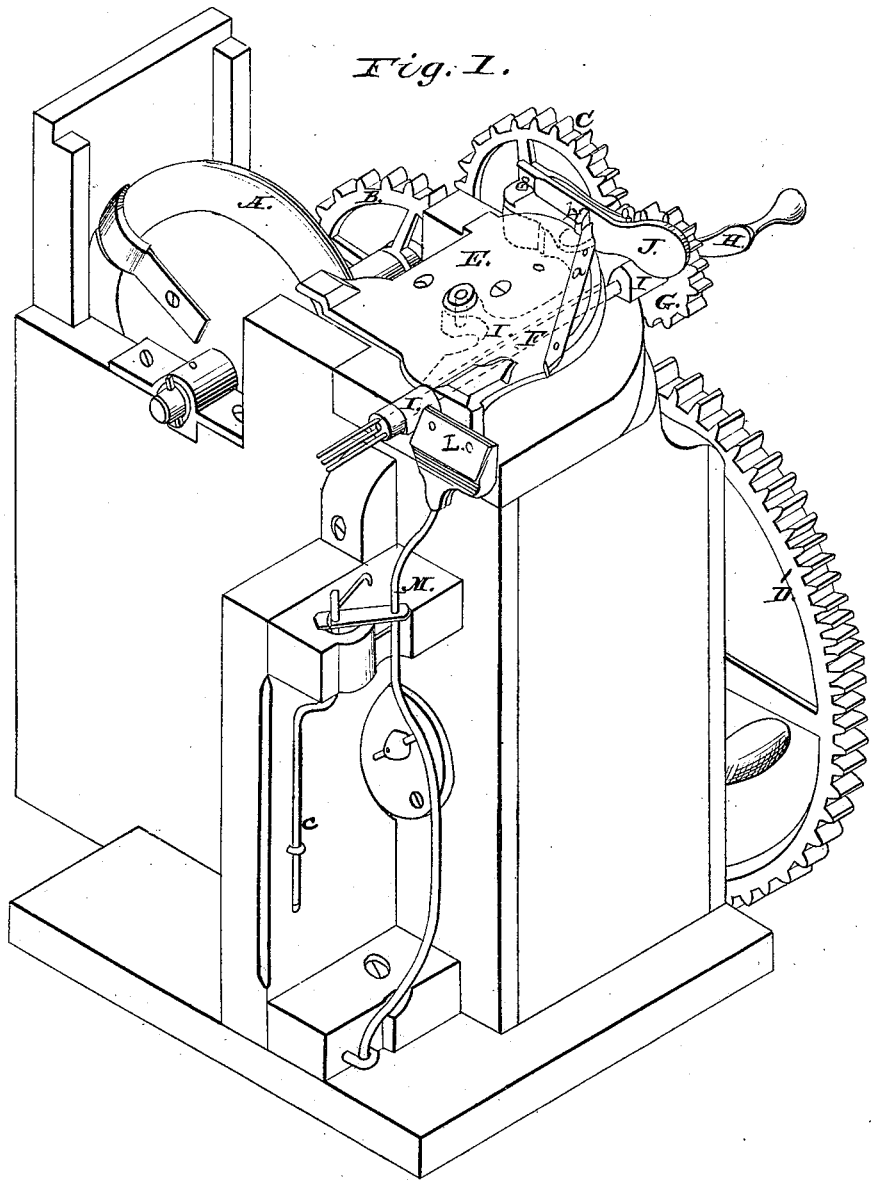

LEVI VAN HOESEN, OF NEW HAVEN, CONNECTICUT.

MACHINE FOR PARING AND SLICING APPLES.

Specification of Letters Patent No. 13,891, dated December 4, 1855.

*To all whom it may concern:*

Be it known that I, LEVI VAN HOESEN, of the town and county of New Haven and State of Connecticut, have invented a new and useful Machine for Paring and Slicing Apples so That They Shall be in Good Condition to Dry, Preserve, or Use in other Ways; and I also claim that the form of the slice cut by the said machine expedites the drying or preserving of the same for use.

The description of the machine and machinery which I have invented for this purpose is as follows: The box upon which the machinery stands, of which Figure 1, is a perspective view with machinery attached, is eleven inches in length, five inches in width and nine inches in height with a projection at one end two inches in height and five inches in length supporting some parts of the machinery. The inside of this box is so constructed as to receive a cutter wheel to which cutters are attached for the purpose of slicing the apple. In the bottom of the said box is an opening through which the slices pass.

The cutter wheel, Fig. 1, letter A, is six inches in diameter, more or less, as the practical operation of the machine may require concaved upon one side and convexed upon the other near the center. The outer edge of the said wheel is thrown back or rolled over so as to give it the form of a circle or half circle to correspond with the form of the knives or gouges which cut or slice the fruit, the curve of the rim of said wheel being equal to circle of one inch and one quarter in diameter. The sides of the said cutter wheel are grooved and the edge of the circle is cut out in which grooves and openings cutters are inserted of circular shape corresponding with the circle of the said wheel and projecting beyond the surface of the same sufficient to cut a slice of any desirable thickness. The cutters and wheel may be so constructed as to cut the slice of any desirable form. This said cutter wheel hangs on a shaft of proper diameter and length to sustain the same and is made to revolve by a gear wheel attached to one end of the shaft. This wheel is two and one half inches in diameter, numbered letter B in drawing, and meshes into another gear wheel, letter D, of corresponding gear, which said wheel, letter E, is nine inches in diameter, more or less. To one of the arms of the last mentioned wheel a handle is attached for the purpose of putting the machinery in motion by the hand. This wheel is attached to the box by a shaft passing through the same and revolving on suitable bearings.

Attached to the box a little forward of the main or driving wheel is a wheel, letter C, three inches in diameter meshing into the gear of the main or driving wheel. The design of the last described wheel is to put in motion the wheel and shaft which causes the apple to revolve while in process of paring.

Passing over the top of the box and under a plate or cap is a shaft, letter F, of suitable length and diameter, to one end of which is attached a gear wheel, G, about two inches in diameter meshing into wheel C. Outside of wheel G is a crank, H, for turning the apple by the hand while slicing. Wheel G causes the apple to revolve while paring. Crank H revolves the apple by hand while slicing. At the end of the shaft opposite to gear wheel G, and crank H, is a projection one half inch in length and about five-eighths of an inch in length. In this projection of the shaft are placed three prongs, upon which prongs the apple is secured and held while in process of paring and slicing. Letter I, is the part which sustains the shaft F and is about five inches in length, having a projection on one end running backward about two and one half inches to sustain a latch. Near the center of this part is another projection about one inch in length, through which passes a pivot, upon which it swings around one quarter of an inch. This pivot passes through the cap above. Attached to the projection at the end of part I is a latch J, of about three inches in length and of suitable width and thickness secured and held in its place by a rivet at the back end, which latch is acted upon by a spring of suitable strength, which spring is riveted to the latch at one end and acts against a stud at the other end. On the inside and near the center of this latch is a stud projecting about one eighth of an inch, which stud acts upon a catch secured to a cap and retains the machinery in its place while the apple is paring and by revolving one quarter of a circle; also secures it in its place while slicing. Over the part I is a cap, E of about three inches in width and about three and one half inches in length and one eighth of an inch in thickness. On the under side of this cap are three projections of about half an inch in width, which projections are for the purposes of sustaining it in its place and through which it is secured to the box. Under this cap and between the cap and the box part I vibrates one quarter of a circle. On the circular side of this cap is a catch a, of about three inches in length projecting over the cap at each end so as to act upon the stud b, in the latch and holds the machinery in its place while paring and while slicing the apple. On the side of the box under the fork or prongs while the apple is paring is a projection about two and one half inches in width and about seven inches in length for the purpose of sustaining the rod upon which the knife, L, is placed. At the top and at the bottom of this projection, is another projection of about one inch and one quarter in width on which the rod which sustains the knife swings. On these projections is hung a rod, M, which rod sustains a knife for paring the apple and swings around or vibrates one half of a circle. Said rod is hung at the bottom through a staple and at the upper projection passes through a loop about one and one half inches in length. Through the upper projection and through the loop passes a small wire spring c, which holds the rod in its place and gives it elasticity sufficient to fit the irregularities of the apple. On the top of this rod is placed a knife, L. This knife is fastened to a stock of proper size and shape and made of brass or other suitable material which stock and knife are firmly secured to the top of the rod by riveting or otherwise.

The knife is made to revolve around the apple one half of a circle while the apple is being pared by the hand which is placed on the rod near the center of its length, which rod is so constructed as to be convenient for the purpose.

What I claim as my invention and improvement in the above described machine and for which I solicit a patent is—

The combination of a paring with a slicing machine, when constructed and combined substantially as herein described that is, with an arrangement whereby the fork carrying the apple, may be turned so as alternately to be brought into play with the paring knife, and with the slicing wheel, being at the same time thrown into gear in the former case, and out of gear in the latter.

LEVI VAN HOESEN.

Witnesses:
SAMUEL G. STODDARD,
MARY JANE VAN HOESEN.